(12) United States Patent
Togashi

(10) Patent No.: US 8,107,217 B2
(45) Date of Patent: Jan. 31, 2012

(54) MULTILAYER CAPACITOR

(75) Inventor: Masaaki Togashi, Tokyo (JP)

(73) Assignee: TDK Corporation, Tokyo (JP)

( * ) Notice: Subject to any disclaimer, the term of this patent is extended or adjusted under 35 U.S.C. 154(b) by 304 days.

(21) Appl. No.: 12/626,108

(22) Filed: Nov. 25, 2009

(65) Prior Publication Data

US 2010/0157506 A1    Jun. 24, 2010

(30) Foreign Application Priority Data

Dec. 22, 2008  (JP) ................................ 2008-326268

(51) Int. Cl.
  *H01G 4/228* (2006.01)
  *H01G 4/005* (2006.01)
(52) U.S. Cl. ........................................ 361/309; 361/303
(58) Field of Classification Search .................. 361/303, 361/308.1, 309
  See application file for complete search history.

(56) References Cited

U.S. PATENT DOCUMENTS

| 5,018,047 A * | 5/1991 | Insetta et al. .................. 361/277 |
| 6,661,640 B2 | 12/2003 | Togashi |
| 7,458,151 B2 | 12/2008 | Onodera et al. |
| 2003/0026059 A1 | 2/2003 | Togashi |
| 2003/0102502 A1* | 6/2003 | Togashi ........................ 257/303 |
| 2008/0074825 A1 | 3/2008 | Togashi |

FOREIGN PATENT DOCUMENTS

| CN | 1402274 A | 3/2003 |
| CN | 1808696 A | 7/2006 |
| JP | A-10-135088 | 5/1998 |
| JP | A-2001-60530 | 3/2001 |
| JP | A-2003-51423 | 2/2003 |
| JP | A-2006-156811 | 6/2006 |
| JP | A-2008-84894 | 4/2008 |
| KR | 2006-60819 | 6/2006 |
| KR | 2008-27736 | 3/2008 |

* cited by examiner

*Primary Examiner* — Eric Thomas
(74) *Attorney, Agent, or Firm* — Oliff & Berridge, PLC

(57) ABSTRACT

Each of second terminal portions of a first terminal electrode has a wide part a width of which is larger than a first lead width of lead portions in each first internal electrode, and a narrow part a width of which decreases from the wide part toward the second terminal electrode and toward the first or second side face side. In a multilayer capacitor, the wide part causes an electric current to flow in the lead portions of the first internal electrodes in a direction opposite to that of an electric current flowing in the first terminal electrode, so as to cancel magnetic field thereof each other and thereby reduce ESL, and the narrow part prevents a solder bridge from occurring between the first terminal electrode and the second terminal electrode in a work of mounting the terminal electrodes of the multilayer capacitor on a circuit board or the like.

6 Claims, 15 Drawing Sheets

Fig.12
(a)
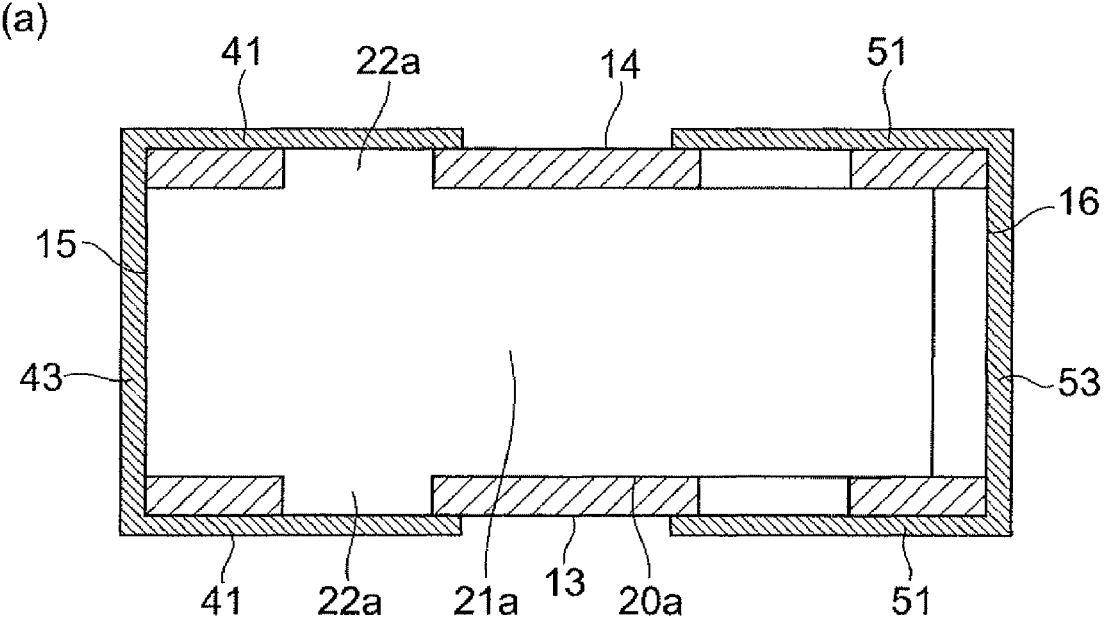
(b)
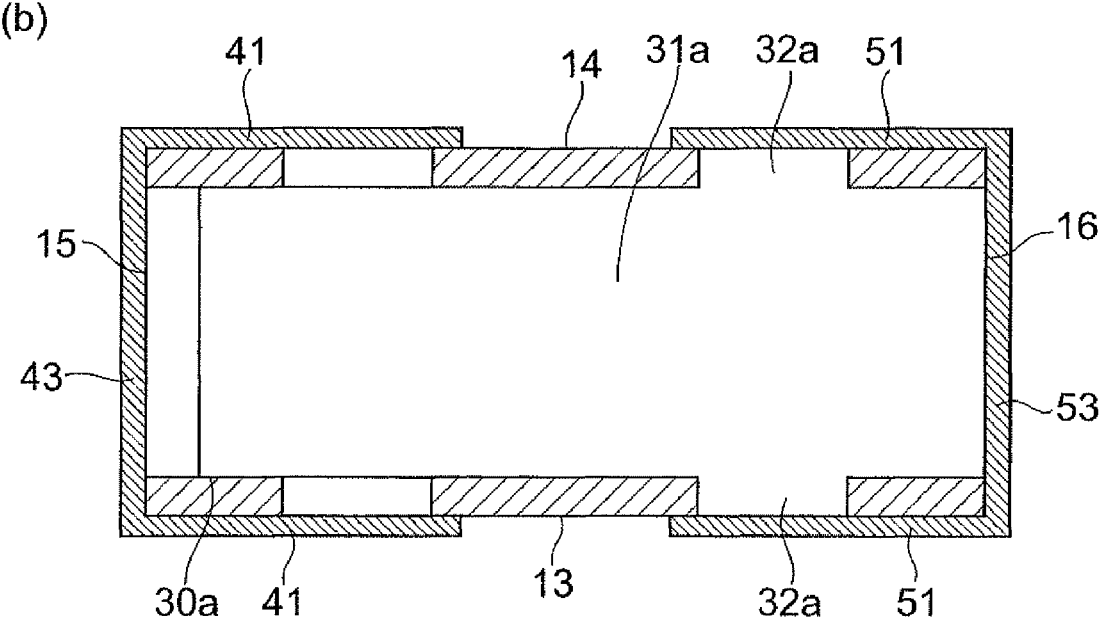

Fig.15
(a)
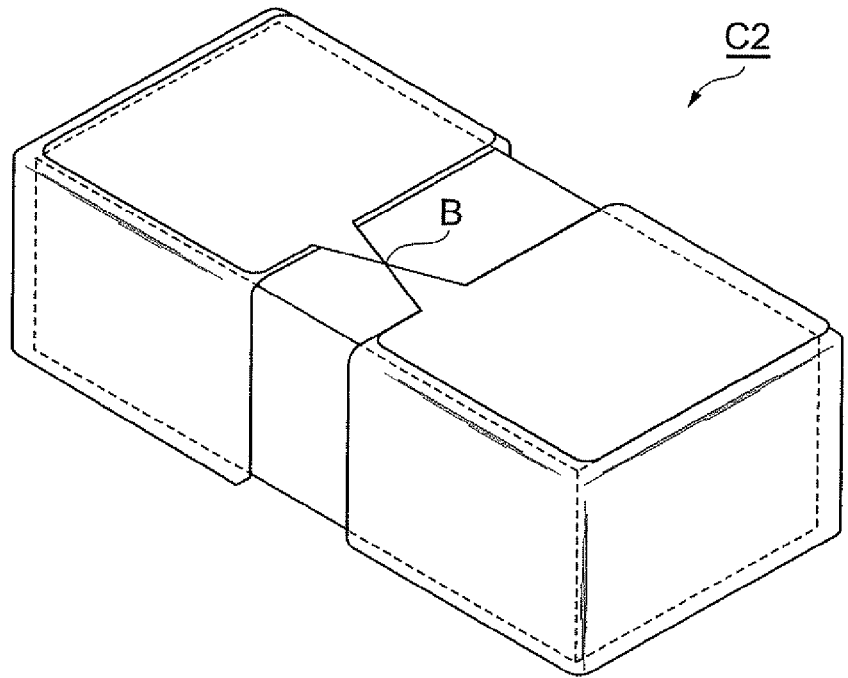
(b)
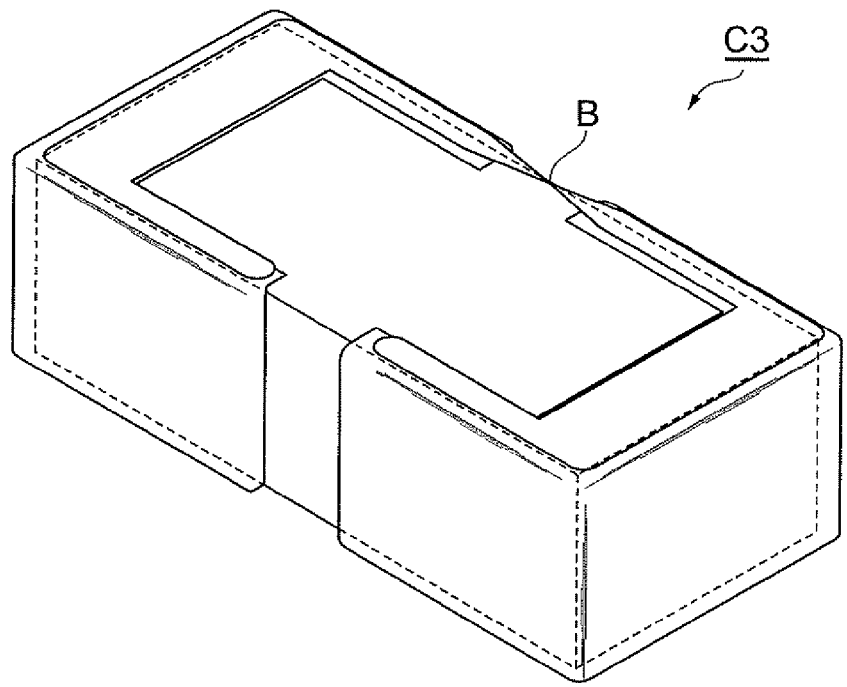

MULTILAYER CAPACITOR

BACKGROUND OF THE INVENTION

1. Field of the Invention

The present invention relates to a multilayer capacitor.

2. Related Background Art

There is a known multilayer capacitor having a dielectric element body of a nearly rectangular parallelepiped shape in which a plurality of dielectric layers are laminated together, two types of internal electrodes arranged in the dielectric element body, and two terminal electrodes each extending over three side faces of the dielectric element body (e.g., cf. Japanese Patent Application Laid-open No. 2003-051423). In the multilayer capacitor disclosed in this patent document, each of the two types of internal electrodes has a structure in which it is drawn out to the two side faces of the dielectric element body, and thus electric currents flow in opposite directions in the two types of internal electrodes, whereby magnetic fields made thereby cancel each other to reduce the equivalent series inductance (which will be referred to hereinafter as "ESL").

SUMMARY OF THE INVENTION

In the multilayer capacitor disclosed in Japanese Patent Application Laid-open No. 2003-051423, however, the degree of reduction in ESL is dependent on the lead width of the internal electrodes and therefore, for achieving reduction in ESL while also achieving miniaturization of the multilayer capacitor, there was a limit of reduction in ESL in terms of the structure and it was difficult to achieve further reduction in ESL.

An object of the present invention is to provide a multilayer capacitor achieving reduction in ESL while also achieving miniaturization.

In order to accomplish the above object, the inventors conducted elaborate research and came to focus attention on directions of electric currents flowing in an internal electrode 60 and terminal electrodes 61 on the mount surface side in the multilayer capacitor (cf. a sectional view of FIG. 14). Then we discovered that ESL could be reduced by providing each of the mount-surface-side terminal electrodes 61 in which the electric current flows perpendicularly to the electric current flowing in the internal electrode 60, with a portion in which the electric current flows opposite to the electric current in the internal electrode 60.

Incidentally, in the case of a multilayer capacitor C2 having the terminal electrodes spreading throughout the entire length in the transverse direction of the mount surface in order to provide each of the terminal electrodes 61 with the portion where the electric current flows opposite to the electric current in the internal electrode 60, or in the case of a multilayer capacitor C3 having the terminal electrodes of a fixed terminal width, the reduction effect in ESL can be achieved, but since the multilayer capacitor is miniaturized, for example, so that the longitudinal length of the multilayer capacitor is about 1 mm, a solder bridge B can be made between the terminal electrodes, as shown in FIG. 15, in a process of mounting the terminal electrodes of the multilayer capacitor on a circuit board or the like. Therefore, the inventors discovered that ESL could be reduced while achieving miniaturization, if the terminal electrodes were provided with respective portions in which the electric current flowed opposite to that in the internal electrode, while suppressing occurrence of the solder bridge or the like in the mounting process, thereby accomplishing the present invention.

A multilayer capacitor according to the present invention is a multilayer capacitor comprising: a capacitor element body having first and second principal faces of a rectangular shape opposed to each other, first and second side faces opposed to each other and extending in a long-side direction of the first and second principal faces so as to connect the first and second principal faces, and third and fourth side faces opposed to each other and extending in a short-side direction of the first and second principal faces so as to connect the first and second principal faces; a first internal electrode arranged in the capacitor element body and having two lead portions extending in a first lead width and toward the first and second side faces, respectively; a second internal electrode arranged in the capacitor element body so as to be opposed at least in part to the first internal electrode in a direction in which the first and second principal faces are opposed, and having two lead portions extending in a second lead width and toward the first and second side faces, respectively; a first terminal electrode having first terminal portions arranged on the first side face and on the second side face, respectively, on the third side face side and connected to the two lead portions, respectively, of the first internal electrode, and second terminal portions arranged on the first side face side and on the second side face side, respectively, on the second principal face and connected to the first terminal portions, respectively; and a second terminal electrode having third terminal portions arranged on the first side face and on the second side face, respectively, on the fourth side face side and connected to the two lead portions, respectively, of the second internal electrode, and fourth terminal portions arranged on the first side face side and on the second side face side, respectively, on the second principal face and connected to the third terminal portions, respectively, wherein each of the second terminal portions of the first terminal electrode includes a wide part a width of which in a direction in which the first and second side faces are opposed, is wider than the first lead width of the lead portions in the first internal electrode, and a narrow part the width of which decreases from the wide part toward the second terminal electrode and toward the first or second side face side on which each second terminal portion is arranged.

In the multilayer capacitor according to the present invention, each second terminal portion has the wide part the width of which is wider than the first lead width of the lead portions in the first internal electrode, and the narrow part the width of which decreases from the wide part toward the second terminal electrode and toward the first or second side face side. The wide part causes the electric current to flow in the lead portion of the first internal electrode in the direction opposite to the electric current flowing in the first terminal electrode, and the narrow part prevents the solder bridge from occurring between the first terminal electrode and the second terminal electrode in the process of mounting the terminal electrodes of the multilayer capacitor on a circuit board or the like. As a result, it becomes feasible to reduce ESL while achieving miniaturization of the multilayer capacitor. Since each terminal electrode is arranged within a certain range without spreading throughout the entire length in the transverse direction of the principal face used in the mounting process, this configuration ensures a space for suction of the multilayer capacitor by a mounter in the mounting process, which reduces suction failure. Furthermore, it also prevents thermal shock damage due to thermal stress difference between the terminal electrodes and the capacitor element body.

Preferably, the first terminal electrode has a fifth terminal portion arranged on the third side face to connect the first terminal portions to each other, and connected to the first internal electrode. In this case, the first terminal electrode leads the first internal electrode out through the three side faces, so as to reduce the equivalent series resistance (which will be referred to hereinafter as "ESR").

Preferably, the first terminal electrode has sixth terminal portions arranged on the first side face side and on the second side face side, respectively, on the first principal face and connected to the first terminal portions, respectively, and each of the sixth terminal portions has a wide part a width of which in the direction in which the first and second side faces are opposed, is larger than the first lead width of the lead portions in the first internal electrode, and a narrow part the width of which decreases from the wide part toward the second terminal electrode and toward the first or second side face side on which each sixth terminal portion is arranged. In this case, either of the first and second principal faces can be used as a mount surface, so as to facilitate a mounting work.

Preferably, each of the fourth terminal portions of the second terminal electrode includes a wide part a width of which in the direction in which the first and second side faces are opposed, is wider than the second lead width of the lead portions in the second internal electrode, and a narrow part the width of which decreases from the wide part toward the first terminal electrode and toward the first or second side face side on which each fourth terminal portion is arranged, and Formula (1) below is satisfied:

$$3.4 \times (a+b) + 1.5 \times c + 0.16 \times \{(d+e)/(f+g)\} \leq 1.5 \qquad (1),$$

where a (mm) is the first lead width of the lead portions in the first internal electrode, b (mm) the second lead width of the lead portions in the second internal electrode, c (mm) a distance between the lead portions in the first internal electrode and the lead portions in the second internal electrode, d (mm) a distance between the first terminal electrode on the second principal face and the first internal electrode, e (mm) a distance between the second terminal electrode on the second principal face and the second internal electrode, f (mm) the width in the wide part in one of the second terminal portions on the first side face side and in one of the fourth terminal portions on the first side face side, and g (mm) the width in the wide part in the other of the second terminal portions on the second side face side and in the other of the fourth terminal portions on the second side face side. In this case, ESL is further reduced while achieving miniaturization of the multilayer capacitor; for example, the ESL value can be not more than 250 pH, which is a reference value permitting the number of used multilayer capacitors to be reduced by half.

Preferably, the second terminal electrode has a seventh terminal portion arranged on the fourth side face to connect the third terminal portions to each other, and connected to the second internal electrode. In this case, the second terminal electrode leads the second internal electrode out through the three side faces, so as to reduce ESR.

Preferably, the second terminal electrode has eighth terminal portions arranged on the first side face side and on the second side face side, respectively, on the first principal face and connected to the third terminal portions, respectively, and each of the eighth terminal portions includes a wide part a width of which in the direction in which the first and second side faces are opposed, is wider than the second lead width of the lead portions in the second internal electrode, and a narrow part the width of which decreases from the wide part toward the first terminal electrode and toward the first or second side face side on which each eighth terminal portion is arranged. In this case, either of the first and second principal faces can be used as a mount surface, which facilitates the mounting work.

The present invention will become more fully understood from the detailed description given hereinbelow and the accompanying drawings which are given by way of illustration only, and thus are not to be considered as limiting the present invention. Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

FIG. 12 is a sectional view showing a modification example of internal electrodes.

FIG. 15 is a sectional view showing another multilayer capacitor.

DESCRIPTION OF THE PREFERRED EMBODIMENTS

The preferred embodiments will be described below in detail with reference to the accompanying drawings. In the description the same elements or elements with the same functionality will be denoted by the same reference symbols, without redundant description. A configuration of a multilayer capacitor 1 according to an embodiment of the present invention will be described with reference to FIGS. 1 to 9.

Figure 1:
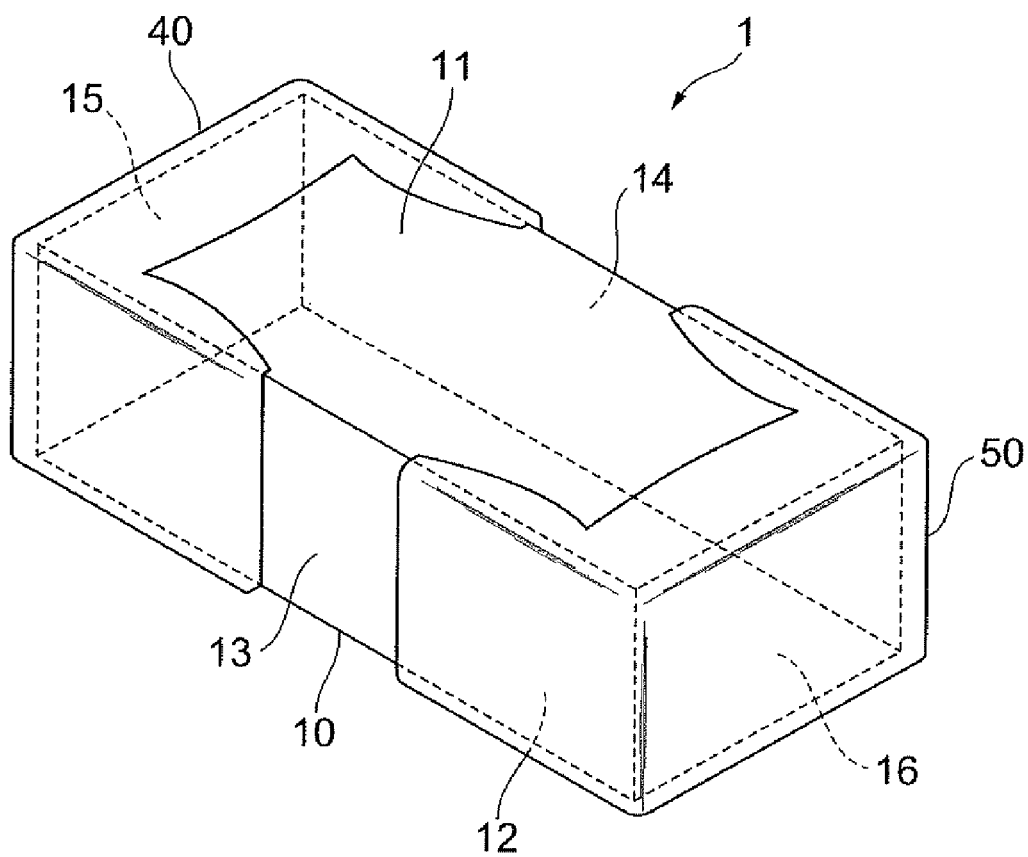
FIG. 1 is a perspective view of a multilayer capacitor according to an embodiment of the present invention.
Figure 2:
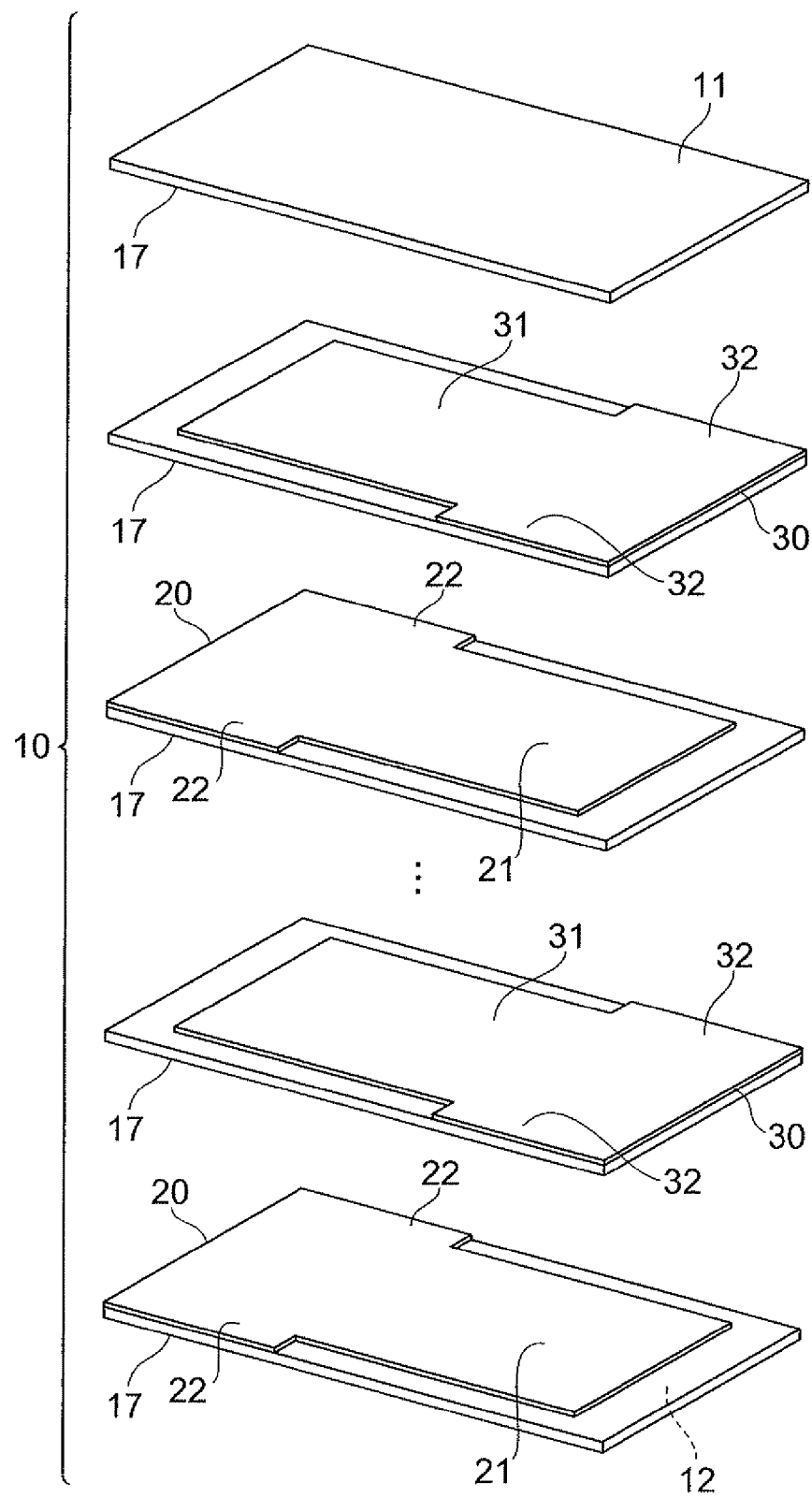
FIG. 2 is an exploded perspective view of a capacitor element body included in the multilayer capacitor according to the embodiment.

The multilayer capacitor 1, as shown in FIGS. 1 and 2, has a capacitor element body 10, first internal electrodes 20, second internal electrodes 30, a first terminal electrode 40, and a second terminal electrode 50.

The capacitor element body 10 is of a nearly rectangular parallelepiped shape and has first and second principal faces 11, 12 of a rectangular shape opposed to each other, first and second side faces 13, 14 opposed to each other and extending in the long-side direction of the first and second principal faces 11, 12 so as to connect the first and second principal faces 11, 12, and third and fourth side faces 15, 16 opposed to each other and extending in the short-side direction of the first and second principal faces 11, 12 so as to connect the first and second principal faces 11, 12. The first principal face 11 or the second principal face 12 serves as a mount surface when mounted on another component (e.g., a circuit board, an electronic component, or the like).

The capacitor element body 10, as shown in FIG. 2, has a plurality of insulator layers 17. The capacitor element body 10 has a configuration wherein the plurality of insulator layers 17 are laminated together in a direction in which the first and second principal faces 11, 12 are opposed to each other (which will also be referred to as "lamination direction"), and has a dielectric property. The top surface of the uppermost insulator layer 17 out of the plurality of insulator layers 17 is the first principal face 11 and the bottom surface of the lowermost insulator layer 17 is the second principal face 12. Each of the insulator layers 17 is composed, for example, of a sintered body of a ceramic green sheet containing a dielectric ceramic (dielectric ceramic of a $BaTiO_3$ type, $Ba(Ti,Zr)O_3$ type, or $(Ba,Ca)TiO_3$ type). In a practical multilayer capacitor 1, the insulator layers 17 are so integrated that no boundary can be visually recognized between them.

The first internal electrodes 20, as shown in FIG. 2, are laid on the respective insulator layers 17 of the capacitor element body 10 and are fixedly arranged in the capacitor element body 10 through sintering of the capacitor element body 10. Each first internal electrode 20 is of a nearly rectangular shape and has a first main electrode portion 21 and two lead portions 22 (cf. FIG. 4). The main electrode portion 21 and the two lead portions 22 are integrally formed. The main electrode portion 21 is configured to extend from one end exposed in the third side face 15, toward the fourth side face 16 up to before it so that the other end is not exposed from the fourth side face 16. One of the lead portions 22 extends in a first lead width and from the edge of the main electrode portion 21 on the first side face 13 side so that its end is exposed in the first side face 13. The other lead portion 22 extends in the first lead width and from the edge of the main electrode portion 21 on the second side face 14 side so that its end is exposed in the second side face 14.

The second internal electrodes 30, as shown in FIG. 2, are laid on the respective insulator layers 17 different from the insulator layers 17 on which the first internal electrodes 20 are laid, and are fixedly arranged in the capacitor element body 10. Each second internal electrode 30 is of a shape line-symmetric with the first internal electrode 20 with respect to a center line including a centroid of the insulator layer 17 and extending along a direction in which the first and second side faces 13, 14 are opposed, and has one main electrode portion 31 and two lead portions 32 (cf. FIG. 5). The main electrode portion 31 extends from one end exposed in the fourth side face 16, toward the third side face 15 up to before it, so that the other end is not exposed from the third side face 15. One of the lead portions 32 extends in a second lead width and from the edge of the main electrode portion 31 on the first side face 13 side so that its end is exposed in the first side face 13. The other lead portion 32 extends in the second lead width and from the edge of the main electrode portion 31 on the second side face 14 side so that its end is exposed in the second side face 14. In the present embodiment, the first internal electrodes 20 and the second internal electrodes 30 are of the line-symmetric shapes and the first lead width and the second lead width are equal; however, the first lead width and the second lead width do not always have to be equal.

A plurality of first and second internal electrodes 20, 30 (four layers each in the present embodiment, some of which are omitted in FIG. 2) are alternately arranged with the insulator layer 17 in between in the lamination direction in the capacitor element body 10 and are configured so that their main electrode portions 21 and 31 are opposed to each other. Namely, the first and second internal electrodes 20, 30 are opposed in part to each other. These first and second internal electrodes 20, 30 are made of an electroconductive material (e.g., base metal Ni or the like) which is usually used for internal electrodes of multilayer electric elements. The first and second internal electrodes 20, 30 are composed of sintered bodies of an electroconductive paste containing the foregoing electroconductive material.

The first terminal electrode 40 extends over five faces, the first and second side faces 13, 14, the third side face 15, and the first and second principal faces 11, 12 of the capacitor element body 10. The first terminal electrode 40 has two first terminal portions 41, two second terminal portions 42, a fifth terminal portion 43, two sixth terminal portions 44, a ninth terminal portion 45, and a tenth terminal portion 46.

Figure 4:
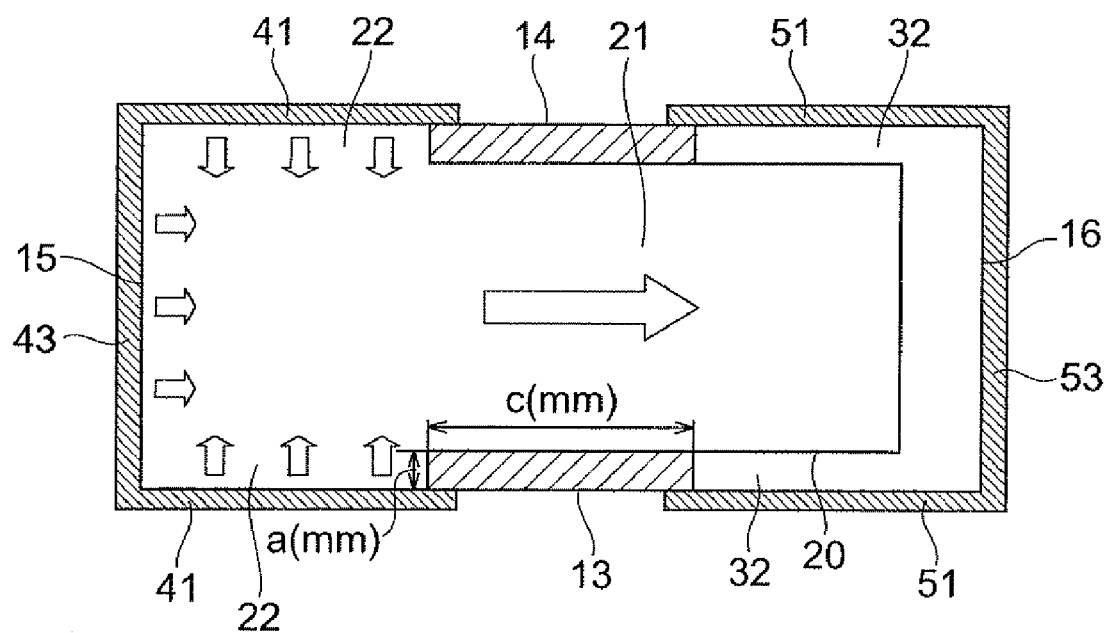
FIG. 4 is a sectional view of the multilayer capacitor showing a planar configuration of a first internal electrode.
Figure 8:
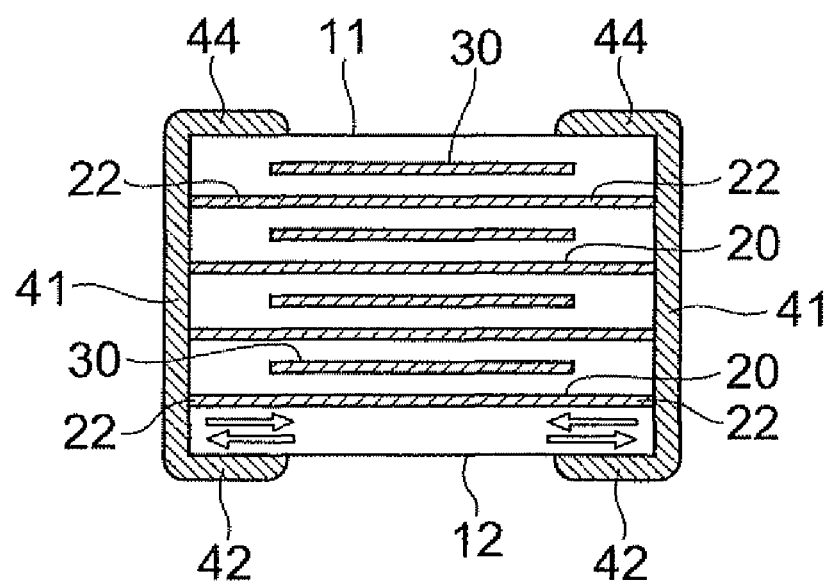
FIG. 8 is a sectional view along line VIII-VIII in FIG. 3.

The first terminal portions 41, as shown in FIGS. 4 and 8, are arranged each throughout the entire length in the direction where the first and second principal faces 11, 12 are opposed, on the first side face 13 and on the second side face 14, respectively, on the third side face 15 side. The first terminal portions 41 are connected to the two lead portions 22, respectively, of each first internal electrode 20. The first terminal portions 41 are connected to each other by the fifth terminal portion 43 spreading over the entire surface of the third side face 15. The fifth terminal portion 43 is connected to the edges of the first internal electrodes 20 on the third side face 15 side.

Figure 6:
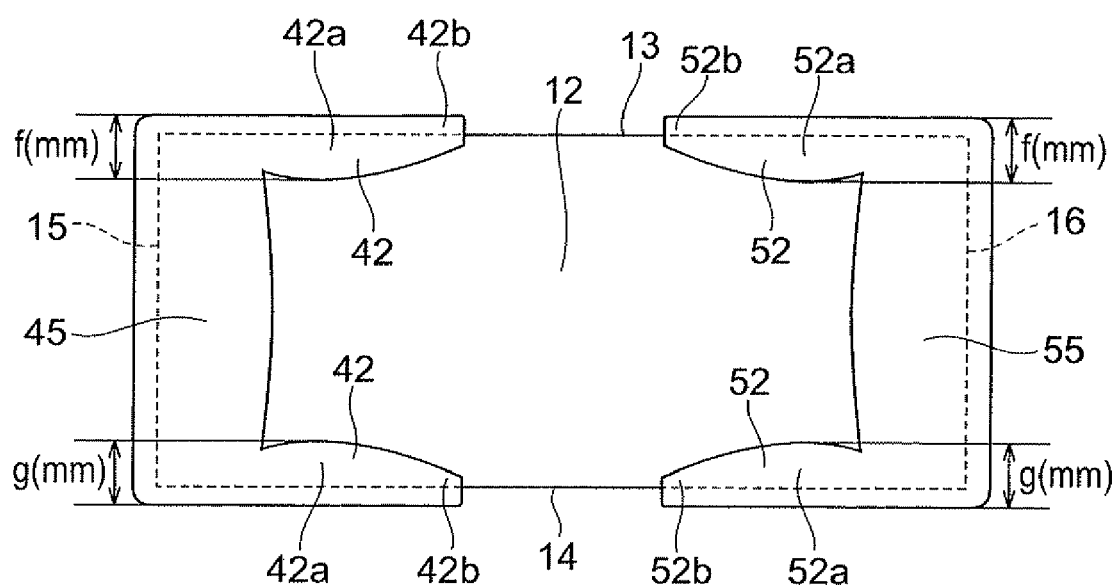
FIG. 6 is a bottom plan view of the multilayer capacitor according to the embodiment.
Figure 7:
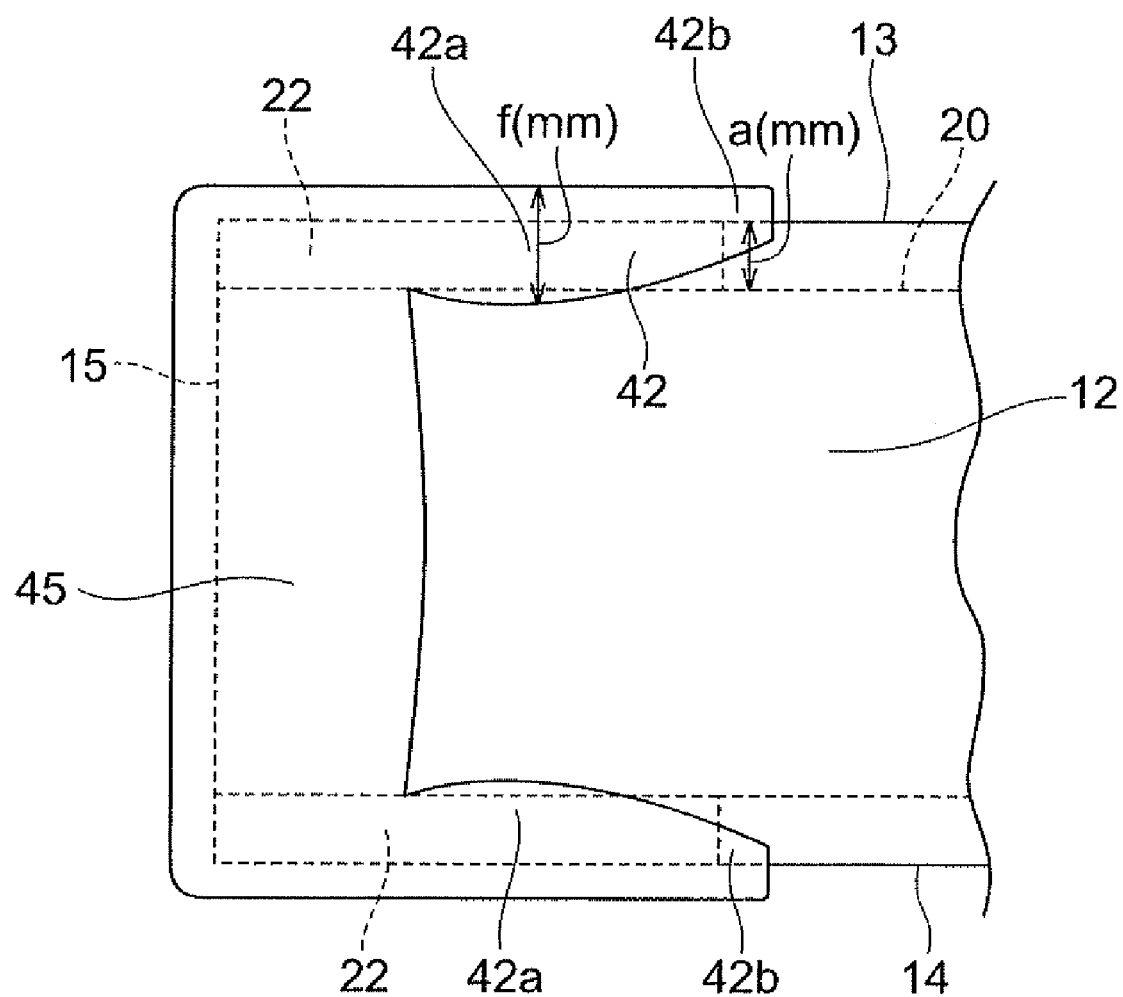
FIG. 7 is a partly enlarged view of FIG. 6.

The second terminal portions 42, as shown in FIGS. 6 to 9, are arranged on the first side face 13 side and on the second side face 14 side, respectively, on the second principal face 12. The second terminal portions 42 are connected to the respective edges of the first terminal portions 41 on the second principal face 12 side and are integrally formed with the first terminal portions 41 and the below-described sixth terminal portions 44. The second terminal portions 42 are formed in a curvilinear, continuous, approximately sectorial shape as projecting in a central region toward a center line of the second principal face 12 along the direction in which the third and fourth side faces 15, 16 are opposed. Each of the second terminal portions 42 of this approximately sectorial shape, as shown in FIG. 7, includes a wide part 42a the width of which in the direction where the first and second side faces 13, 14 are opposed is wider than the first lead width a of the lead portions 22 of the first internal electrodes 20, and a narrow part 42b the width of which in the direction where the first and second side faces 13, 14 are opposed decreases from the wide part 42a toward the second terminal electrode 50 and toward the first or second side face 13 or 14 side where each second terminal portion 42 is arranged, i.e., toward the outside of the second principal face 12. In the present embodiment, the width of the wide part 42a on the first side face 13 side is equal to the width of the wide part 42a on the second side face 14 side, but the two widths do not always have to be equal.

The second terminal portions 42 are connected to each other at one end on the third side face 15 side by the ninth terminal portion 45 arranged throughout the entire length in the direction where the first and second side faces 13, 14 are opposed, on the third side face 15 side on the second principal face 12. This connection forms a terminal portion of an approximate C-shape consisting of the two second terminal portions 42 and the ninth terminal portion 45, on the second principal face 12. Since the terminal portion is of the approximate C-shape (or approximate U-shape) as described above, a sufficient suction space is ensured inside the approximate C-shape in a process of mounting the multilayer capacitor 1 on a board or the like, which facilitates mounting. Since each second terminal portion 42 has the aforementioned wide part 42a and the other part, 80% or more of the area of each lead portion 22 of the first internal electrode 20 is covered by the second terminal portion 42 and the ninth terminal portion 45 (cf. FIG. 7).

Figure 3:
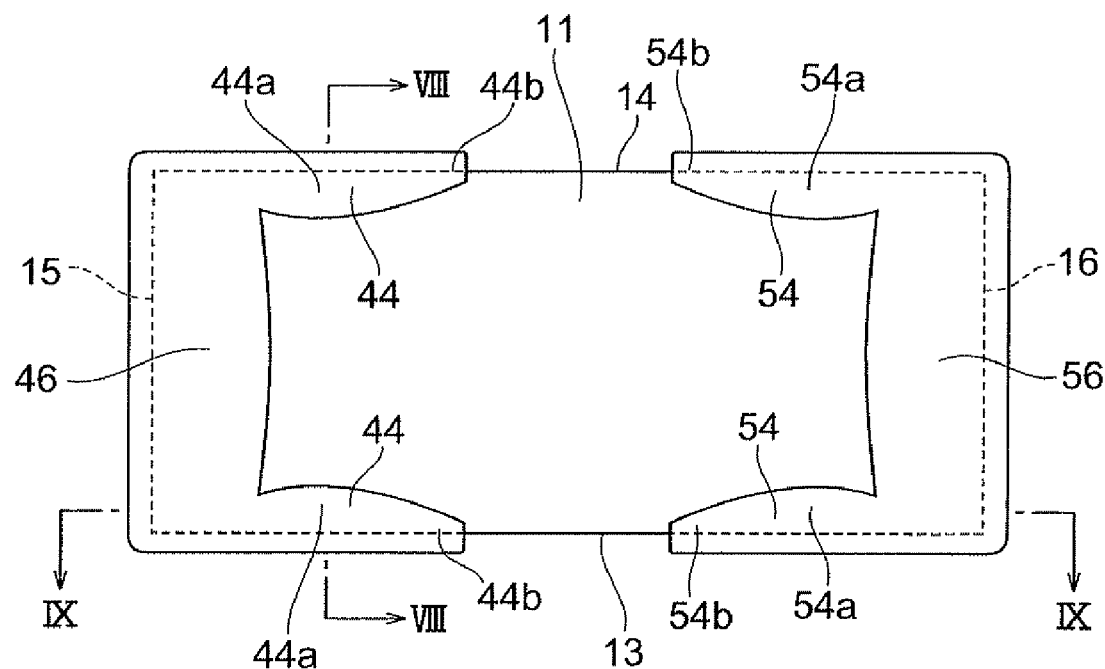
FIG. 3 is a top plan view of the multilayer capacitor according to the embodiment.
Figure 9:
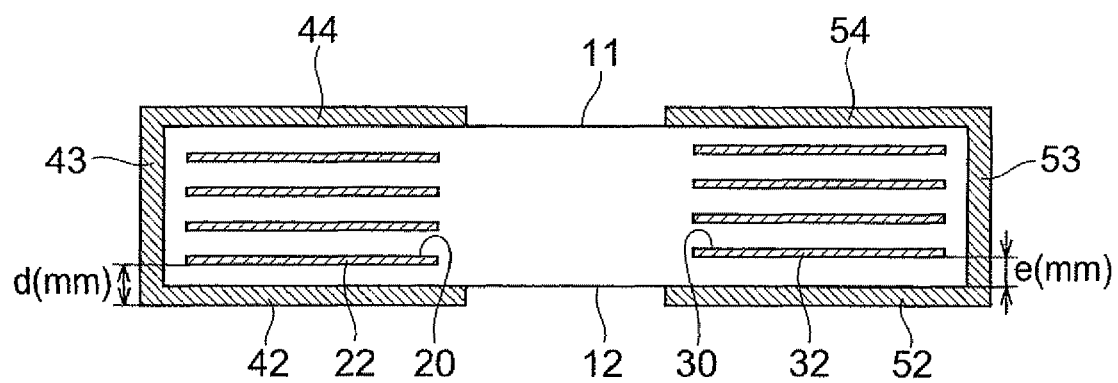
FIG. 9 is a sectional view along line IX-IX in FIG. 3.

The sixth terminal portions 44, as shown in FIGS. 3, 8, and 9, are arranged on the first side face 13 side and on the second side face 14 side, respectively, on the first principal face 11. The sixth terminal portions 44 are connected to the respective edges of the first terminal portions 41 opposite to the connection edges to the second terminal portions 42, to be integrated therewith. The sixth terminal portions 44 are of much the same shape as the second terminal portions 42, and each sixth terminal portion 44 includes a wide part 44a wider than the first lead width of the lead portions 22 of the first internal electrode 20, and a narrow part 44b the width of which in the direction where the first and second side faces 13, 14 are opposed decreases from the wide part 44a toward the second terminal electrode 50 and toward the first or second side face 13 or 14 side where each sixth terminal portion 44 is arranged. The sixth terminal portions 44 are connected to each other at one end on the third side face 15 side by the tenth terminal portion 46 arranged throughout the entire length in the direction where the first and second side faces 13, 14 are opposed, on the third side face 15 side on the first principal face 11.

The second terminal electrode 50 extends over five faces, the first and second side faces 13, 14, the fourth side face 16, and the first and second principal faces 11, 12 of the capacitor element body 10. The second terminal electrode 50 has two third terminal portions 51, two fourth terminal portions 52, a seventh terminal portion 53, two eighth terminal portions 54, an eleventh terminal portion 55, and a twelfth terminal portion 56.

Figure 5:
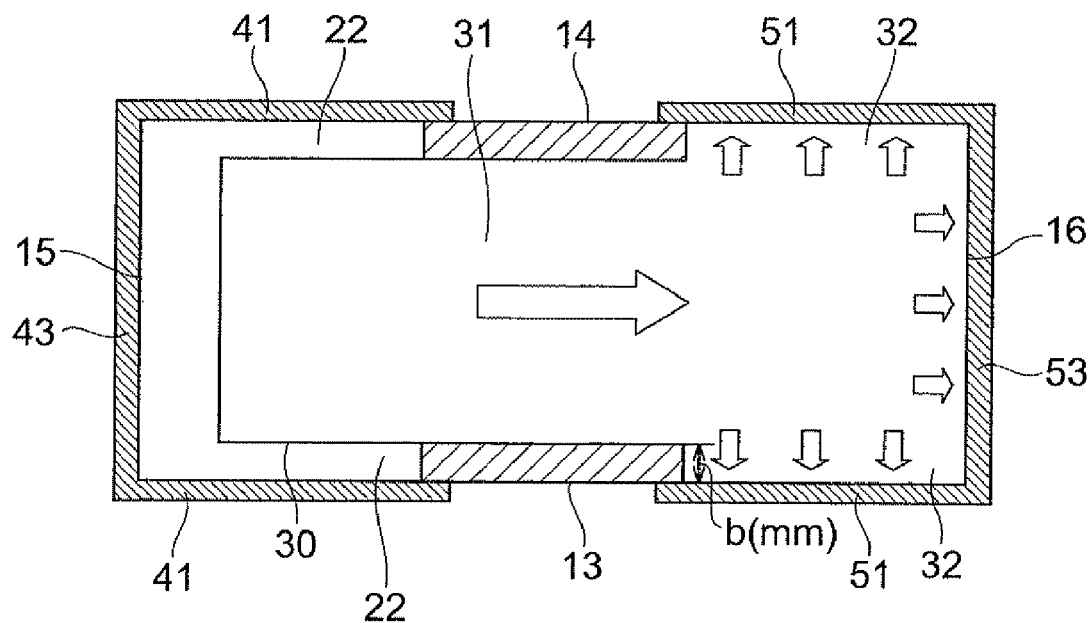
FIG. 5 is a sectional view of the multilayer capacitor showing a planar configuration of a second internal electrode.

The third terminal portions 51, as shown in FIG. 5, are arranged each throughout the entire length in the direction where the first and second principal faces 11, 12 are opposed, on the first side face 13 and on the second side face 14, respectively, on the fourth side face 16 side. The third terminal portions 51 are connected to the two lead portions 32, respectively, of each second internal electrode 30. The third terminal portions 51 are connected to each other by the seventh terminal portion 53 spreading over the entire surface of the fourth side face 16. The seventh terminal portion 53 is connected to the edges of the second internal electrodes 30 on the fourth side face 16 side.

The fourth terminal portions 52, as shown in FIGS. 6 and 9, are arranged on the first side face 13 side and the second side face 14 side, respectively, on the second principal face 12. The fourth terminal portions 52 are connected to the respective edges of the third terminal portions 51 on the second principal face 12 side and are integrally formed with the third terminal portions 51 and the below-described eighth terminal portions 54. The fourth terminal portions 52 are of an approximately sectorial shape as the second terminal portions 42 of the first terminal electrode 40 are, and are formed as projecting in a central region toward the center line of the second principal face 12 (inward). Each of the fourth terminal portions 52 includes a wide part 52a the width of which in the direction where the first and second side faces 13, 14 are opposed is wider than the second lead width b of the lead portions 32 of the second internal electrodes 30, and a narrow part 52b the width of which in the direction where the first and second side faces 13, 14 are opposed decreases from the wide part 52a toward the first terminal electrode 40 and toward the first or second side face 13 or 14 side where each fourth terminal portion 52 is arranged. The fourth terminal portions 52 are connected to each other at one end on the fourth side face 16 side by the eleventh terminal portion 55 arranged throughout the entire length in the direction where the first and second side faces 13, 14 are opposed, on the fourth side face 16 side on the second principal face 12.

The eighth terminal portions 54, as shown in FIGS. 3 and 9, are arranged on the first side face 13 side and on the second side face 14 side, respectively, on the first principal face 11 and are connected to the respective edges of the third terminal portions 51 opposite to the connection edges to the fourth terminal portions 52. The eighth terminal portions 54 are of much the same shape as the fourth terminal portions 52, and each eighth terminal portion 54 includes a wide part 54a wider than the second lead width of the lead portions 32 of the second internal electrode 30, and a narrow part 54b the width of which in the direction where the first and second side faces 13, 14 are opposed decreases from the wide part 54a toward the first terminal electrode 40 and toward the first or second side face 13 or 14 side where each eighth terminal portion 54 is arranged. The eighth terminal portions 54 are connected to each other at one end on the fourth side face 16 side by the twelfth terminal portion 56 arranged throughout the entire length in the direction where the first and second side faces 13, 14 are opposed, on the fourth side face 16 side on the first principal face 11.

The below will describe a method of forming the first and second terminal electrodes 40, 50 in the above-described multilayer capacitor 1. For forming each of the terminal electrodes 40, 50, the first step is, for example, to prepare a transcriber T with rubber-like projections T1, and a sintered capacitor element body 10. Then, as shown in FIG. 10(a), an electroconductive paste P1 containing an electroconductive metal powder and glass fit, is deposited in a predetermined thickness on the transcriber T.

Thereafter, the capacitor element body 10 is moved in a direction indicated by an arrow in the drawing so that the first side face 13 of the capacitor element body 10 is brought into contact with and pressed against the electroconductive paste P1. While the press state is maintained, the capacitor element body 10 is moved back and forth in the direction where the first and second principal faces 11, 12 are opposed (or in the direction normal to the plane of FIG. 10(a)). This back-and-forth movement causes the electroconductive paste P1 to be rubbed on the capacitor element body 10, whereby the electroconductive paste P1 is applied onto the predetermined positions on the three faces of the first side face 13 and the first and second principal faces 11, 12 by a transfer method. This application results in simultaneously forming a portion 141 corresponding to the first terminal portion 41, a portion 142 (not shown) corresponding to the second terminal portion 42, and a portion 144 corresponding to the sixth terminal portion 44 in a mutually connected and integrated state, and a portion 151 corresponding to the third terminal portion 51, a portion 152 (not shown) corresponding to the fourth terminal portion 52, and a portion 154 corresponding to the eighth terminal portion 54 in a mutually connected and integrated state (cf. FIG. 10(b)).

Next, the same application process is also carried out on the second side face 14 of the capacitor element body 10 to simultaneously form portions 141, 142, and 144 corresponding to the first terminal portion 41, the second terminal portion 42, and the sixth terminal portion 44, respectively, in an integrated state and portions 151, 152, and 154 corresponding to the third terminal portion 51, the fourth terminal portion 52, and the eighth terminal portion 54, respectively, in an integrated state. The back-and-forth movement after the press against the transcriber T as described above makes the electroconductive paste P1 flow onto the first and second principal faces 11, 12 to form the approximately sectorial shape of the electroconductive paste in the portions corresponding to the second terminal portion 42, the fourth terminal portion 52, the sixth terminal portion 44, and the eighth terminal portion 54. Thereafter, the capacitor element body 10 with the electroconductive paste P1 thereon is dried.

Figure 10:
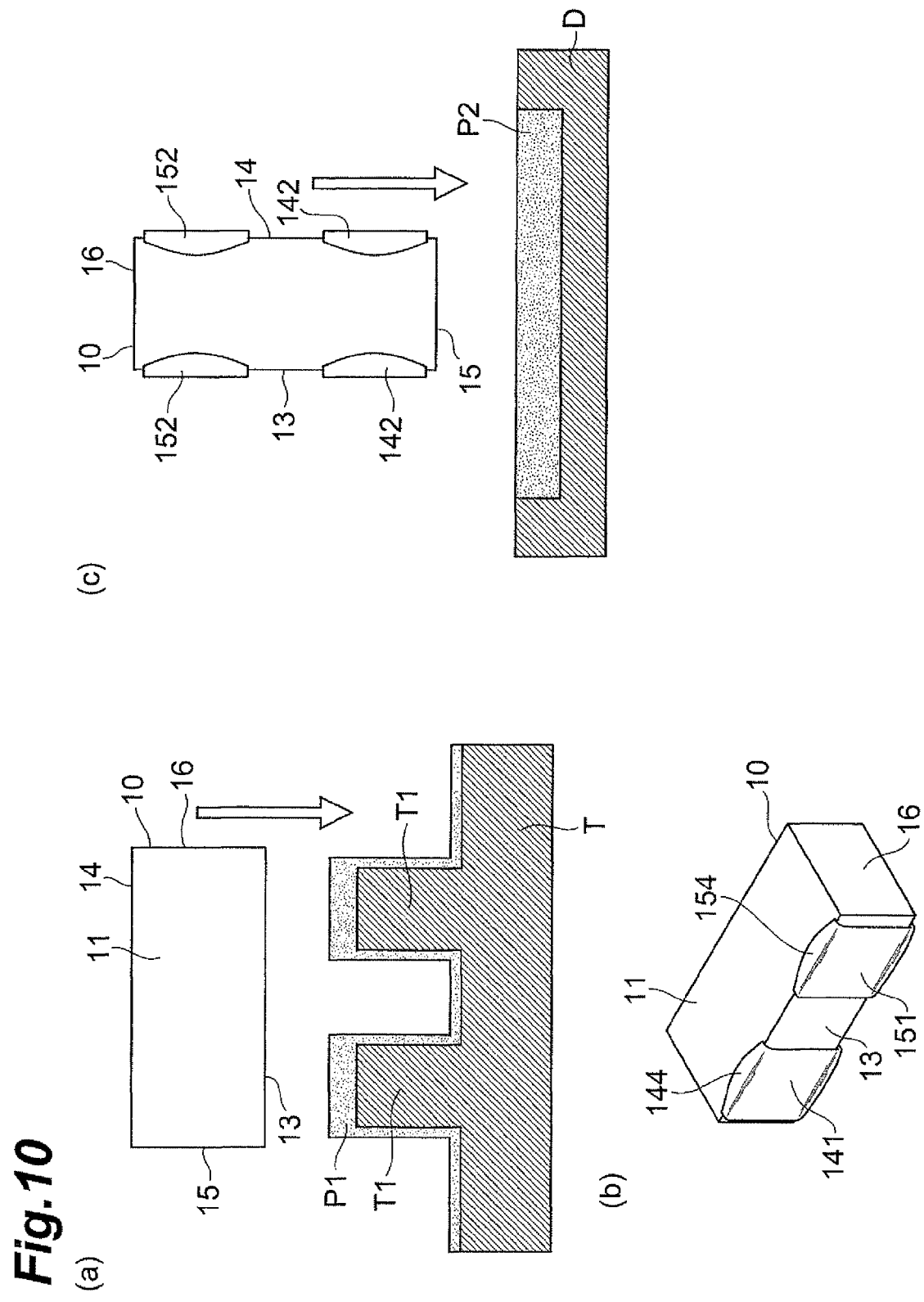
FIG. 10 is a drawing showing a method of forming terminal electrodes of the multilayer capacitor according to the embodiment.

Next, as shown in FIG. 10(c), a bath D filled with the electroconductive paste P2 is prepared and the third side face 15 side of the capacitor element body 10 with the electroconductive paste P1 dried is immersed (or dipped) in the electroconductive paste P2. This immersion results in simultaneously forming portions corresponding to the fifth terminal portion 43, the ninth terminal portion 45, and the tenth terminal portion 46. The fourth side face 16 side of the capacitor element body 10 is also similarly immersed in the electroconductive paste P2 to simultaneously form portions corresponding to the seventh terminal portion 53, the eleventh terminal portion 55, and the twelfth terminal portion 56. After the immersion, the capacitor element body 10 is dried to obtain the multilayer capacitor 1.

In the multilayer capacitor 1 with the terminal electrodes 40, 50 formed as described above, each terminal portion 42, 52, 44, 54 formed in the approximately sectorial shape has the narrow part 42b, 52b, 44b, 54b at the inside position where it extends toward either one 40, 50 of the mutually opposed terminal electrodes, and thus a solder bridge is less likely to occur between the opposed terminal portions, for example, in a process of mounting the terminal electrodes of the multilayer capacitor 1 formed by the above forming method, on a circuit board or the like. In addition, since the terminal portions 42, 52, 44, 54 are accurately arranged by the transfer method of the electroconductive paste P1, the distance between the second terminal portion 42 and the fourth terminal portion 52 and the distance between the sixth terminal portion 44 and the eighth terminal portion 54 can be accurately controlled, and therefore a solder bridge is much less likely to occur between the opposed terminal portions in the mounting process of the terminal electrodes.

Figure 11:
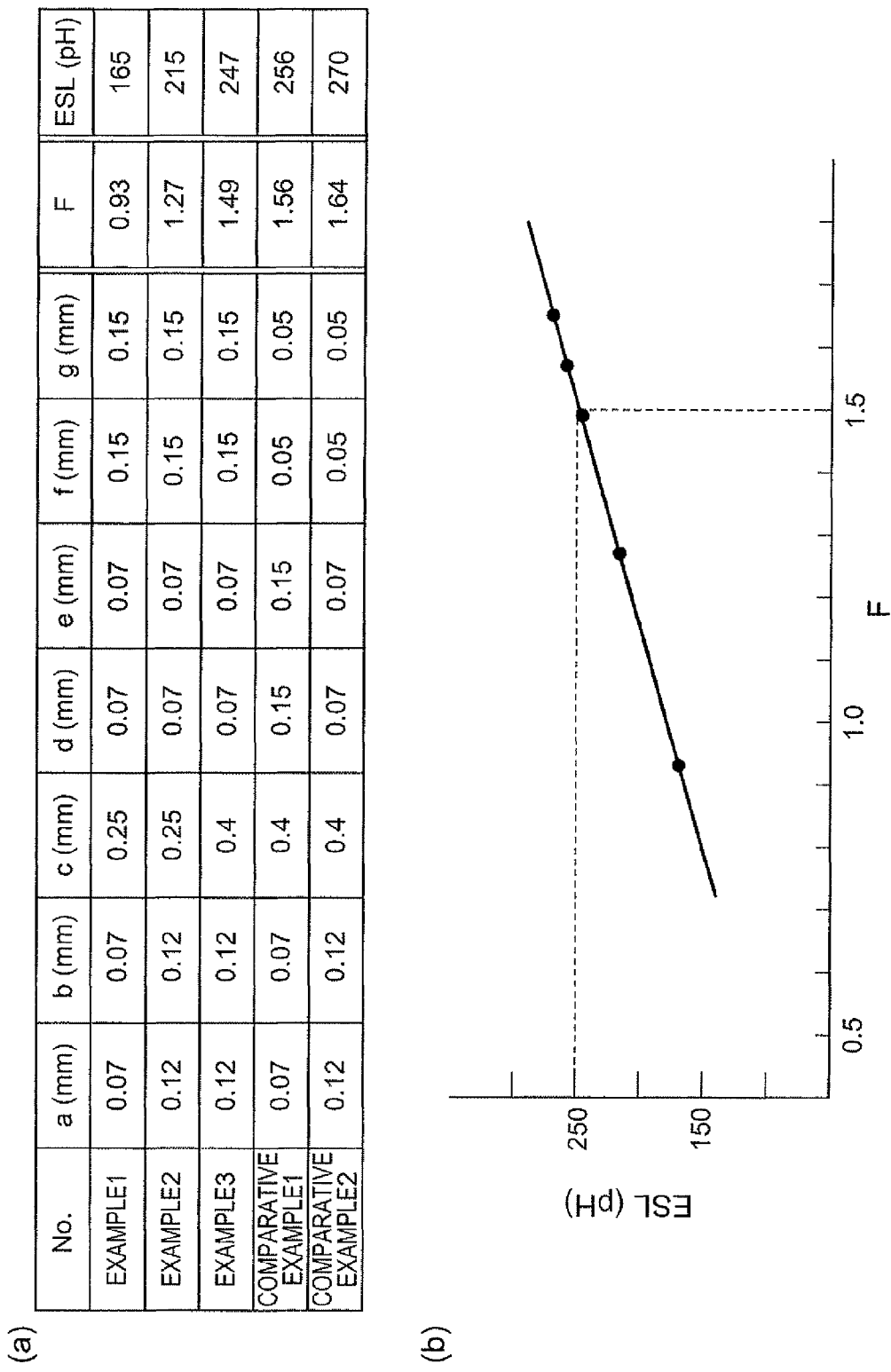
FIG. 11 is a drawing showing ESL values of multilayer capacitors according to examples.

The below will describe ESL values of the multilayer capacitors 1 having the above-described configuration. The multilayer capacitors 1 of the present embodiment used herein are configured in the sizes shown in Examples 1 to 3 in FIG. 11(a) and the multilayer capacitors of comparative examples are configured in the sizes shown in Comparative Examples 1 and 2 in FIG. 11(a). In FIG. 11(a), length a is the first lead width of the lead portions 22 in the first internal electrodes 20 (cf. FIG. 4) and length b the second lead width of the lead portions 32 in the second internal electrodes 30 (cf. FIG. 5). Length c is a distance between the lead portions 33 in the first internal electrodes 20 and the lead portions 32 in the second internal electrodes 30 (cf. FIG. 4). Length d is a distance between the first terminal electrode 40 on the second principal face 12 and the lowermost first internal electrode 20, and length e a distance between the second terminal electrode 50 on the second principal face 12 and the lowermost second internal electrode 30 (cf. FIG. 9). Length f is a width of the wide parts 42a, 52a in one second terminal portion 42 on the first side face 13 side and in one fourth terminal portion 52 on the first side face 13 side, and length g is a width of the wide parts 42a, 52a in the other second terminal portion 42 on the second side face 14 side and in the other fourth terminal portion 52 on the second side face 14 side (cf. FIG. 6). The unit of each of the lengths a-g is mm (millimeter).

First, the multilayer capacitors of the comparative examples will be described. The multilayer capacitor of Comparative Example 1 is configured in the lengths of a=0.07 mm, b=0.07 mm, c=0.4 mm, d=0.15 mm, e=0.15 mm, f=0.05 mm, and g=0.05 mm and the multilayer capacitor of Comparative Example 2 in the lengths of a=0.12 mm, b=0.12 mm, c=0.4 mm, d=0.07 mm, e=0.07 mm, f=0.05 mm, and g=0.05 mm, as shown in FIG. 11(a). In the multilayer capacitors of Comparative Examples 1 and 2, the widths (lengths f and g) of the portions corresponding to the second terminal portions 42 are smaller in the portions corresponding to the wide parts than the first lead width (length a) of the lead portions in the first internal electrodes. In the portions corresponding to the sixth terminal portions 44, the fourth terminal portions 52, and the eighth terminal portions 54, each of the widths thereof is also smaller than the first or second lead width (length a or b).

The ESL values of the multilayer capacitors in Comparative Examples 1 and 2 were measured using an impedance analyzer or a network analyzer, and the results were as follows: the ESL value of the multilayer capacitor of Comparative Example 1 was 256 (pH); the ESL value of the multilayer capacitor of Comparative Example 2 was 270 (pH), as shown in FIG. 11(a).

The below will describe the multilayer capacitors 1 of the present embodiment. As shown in FIG. 11(a), the multilayer capacitor 1 of Example 1 is configured in the lengths of a=0.07 mm, b=0.07 mm, c=0.25 mm, d=0.07 mm, e=0.07 mm, f=0.15 mm, and g=0.15 mm; the multilayer capacitor 1 of Example 2 is configured in the lengths of a=0.12 mm, b=0.12 mm, c=0.25 mm, d=0.07 mm, e=0.07 mm, f=0.15 mm, and g=0.15 mm; the multilayer capacitor 1 of Example 3 is configured in the lengths of a=0.12 mm, b=0.12 mm, c=0.4 mm, d=0.07 mm, e=0.07 mm, f=0.15 mm, and g=0.15 mm. In the multilayer capacitors 1 of Examples 1 to 3, different from the comparative examples, the widths (lengths f and g) of the second terminal portions 42 in the direction where the first and second side faces 13, 14 are opposed are larger in the wide parts 42a than the first lead width (length a) of the lead portions 22 in the first internal electrodes 20. In the sixth terminal portions 44, the fourth terminal portions 52, and the eighth terminal portions 54, each of the widths thereof is also larger than the first or second lead width (length a or b) of the lead portions 22, 32.

The ESL values of the respective multilayer capacitors 1 in Examples 1 to 3 were measured using the impedance analyzer or network analyzer and the results were as follows: as shown in FIG. 11(a), the ESL value of the multilayer capacitor 1 of the first example was 165 (pH); the ESL value of the multilayer capacitor 1 of the second example was 215 (pH); the ESL value of the multilayer capacitor 1 of the third example was 247 (pH). Namely, it was confirmed that the ESL values of the respective multilayer capacitors 1 of Examples 1 to 3 were sufficiently reduced when compared with those of the multilayer capacitors of Comparative Examples 1 and 2. The reason for the reduction in ESL can be assumed as follows: as shown in FIG. 8, an electric current flows in the second terminal portions 42 opposite to an electric current flowing in the lead portions 22 of the first internal electrode 20 as indicated by arrows in FIG. 4 and magnetic fields produced by the two electric currents suitably cancel each other. The electric current canceling effect also occurs between the sixth terminal portions 44 and the first internal electrode 20 (lead portions 22) and between the fourth terminal portions 52 and eighth terminal portion 54, and the second internal electrode 30 (lead portions 32, cf. FIG. 5), so as to further reduce the ESL value.

The multilayer capacitors 1 of respective Examples 1 to 3 also demonstrated that their respective ESL values were not more than 250 (pH), which is a standard ESL value enabling the number of used chip capacitors to be reduced by half, and that the ESL values were sufficiently reduced. Specifically, we found the following new relation: when the multilayer capacitor 1 satisfies Formula (1) below:

$$F=3.4\times(a+b)+1.5\times c+0.16\times\{(d+e)/(f+g)\}\leq 1.5 \quad (1),$$

the ESL value of the multilayer capacitor 1 becomes not more than 250 (pH). Specifically, as shown in FIG. 11(a), the F value of Example 1 is 0.93, the F value of Example 2 is 1.27, and the F value of Example 3 is 1.49, whereas the F values of Comparative Example 1 and Comparative Example 2 are 1.56 and 1.64. FIG. 11(b) shows the relation between the ESL values and the F values based on Formula (1).

In the present embodiment, as described above, each of the second terminal portions 42 of the first terminal electrode 40 has the wide part 42a the width of which is wider than the first lead width of the lead portions 22 in the first internal electrodes 20, and the narrow part 42b the width of which decreases from the wide part 42a toward the second terminal electrode 50 and toward the first or second side face 13, 14 side. In the multilayer capacitor 1, the wide part 42a makes the electric current flow in the lead portion 22 of the first internal electrode 20 opposite to the electric current flowing in the first terminal electrode 40, so as to cancel their magnetic fields each other, and the narrow part 42b prevents a solder bridge from occurring between the first terminal electrode 40 and the second terminal electrode 50 in the process of mounting the terminal electrodes of the multilayer capacitor on a circuit board or the like. As a result, ESL can be reduced while achieving miniaturization of the multilayer capacitor 1. Since each terminal electrode 40, 50 is arranged within a certain range without spreading throughout the entire length in the transverse direction of the principal faces 11, 12 used in mounting, a sufficient space is ensured for suction of the multilayer capacitor 1 by a mounter in the mounting process, so as to reduce suction failure. Furthermore, the above configuration also suppresses thermal shock damage due to thermal stress difference between the terminal electrodes and the capacitor element body.

The first terminal electrode 40 has the fifth terminal portion 43 arranged on the third side face 15 to connect the first terminal portions 41 to each other, and connected to the first internal electrodes 20. In this case, the first terminal electrode 40 leads the first internal electrodes 20 out through the three side faces. As a result, a contact area becomes larger between the lead portions 22 of the first internal electrodes 20 and the first terminal electrode 40, so as to reduce ESR.

The first terminal electrode 40 has the sixth terminal portions 44 arranged on the first side face 13 side and on the second side face 14 side, respectively, on the first principal face 11 and connected to the respective first terminal portions 41, and each of the sixth terminal portions 44 includes the wide part 44a the width of which in the direction where the first and second side faces 13, 14 are opposed is wider than the first lead width of the lead portions 22 in the first internal electrodes 20, and the narrow part 44b the width of which decreases from the wide part 44a toward the second terminal electrode 50 and toward the first or second side face 13, 14 side where each sixth terminal portion 44 is arranged. In this case, the sixth terminal portions 44 also achieve the same effect as the above-described effect by the second terminal portions 42 and therefore either of the first and second principal faces 11, 12 can be used as a mount surface, which facilitates a work of mounting the multilayer capacitor 1 on a board or the like.

The second terminal electrode 50 has the configuration approximately line-symmetric with the first terminal electrode 40 with respect to the line along the direction where the first and second side faces 13, 14 are opposed. Namely, the second terminal electrode 50 can also achieve the ESL reducing effect as the first terminal electrode 40 does. Therefore, the first terminal electrode 40 and the second terminal electrode 50 having the configurations as described above further demonstrate the various effects such as the reduction in ESL and the reduction in solder bridge.

The above described the preferred embodiment of the present invention, but the present invention is by no means limited to the aforementioned embodiment and can be modified in various ways without departing from the scope and spirit of the invention.

The number of laminated insulator layers 17 and the number of laminated internal electrodes 20, 30 in the capacitor element body 10 are not limited to those described in the above embodiment. The shapes of the respective internal electrodes 20, 30 are not limited to those described in the above-described embodiment and modification examples below.

For example, in the first modification example of the internal electrodes shown in FIG. 12, each first internal electrode 20a is of a nearly rectangular shape and has one main electrode portion 21a and two lead portions 22a. The main electrode portion 21a, different from the main electrode portion 21, is configured to extend from one end exposed in part of the third side face 15, toward the fourth side face 16 up to before it. One of the lead portions 22a extends in the first lead width and from the edge of the main electrode portion 21a on the first side face 13 side apart by a predetermined distance from the third side face 15 so that its end is exposed in the first side face 13, and the other lead portion 22a also extends in the first lead width and from the edge of the main electrode portion 21a on the second side face 14 side apart by a predetermined distance from the third side face 15 so that its end is exposed in the second side face 14. Each second internal electrode 30a is of a line-symmetric shape with respect to the line along the direction where the first and second side faces 13, 14 are opposed, and has a main electrode portion 31a and two lead portions 32a, as shown in FIG. 12(b). The other configuration is the same as that of the first and second internal electrodes 20, 30.

Figure 13:
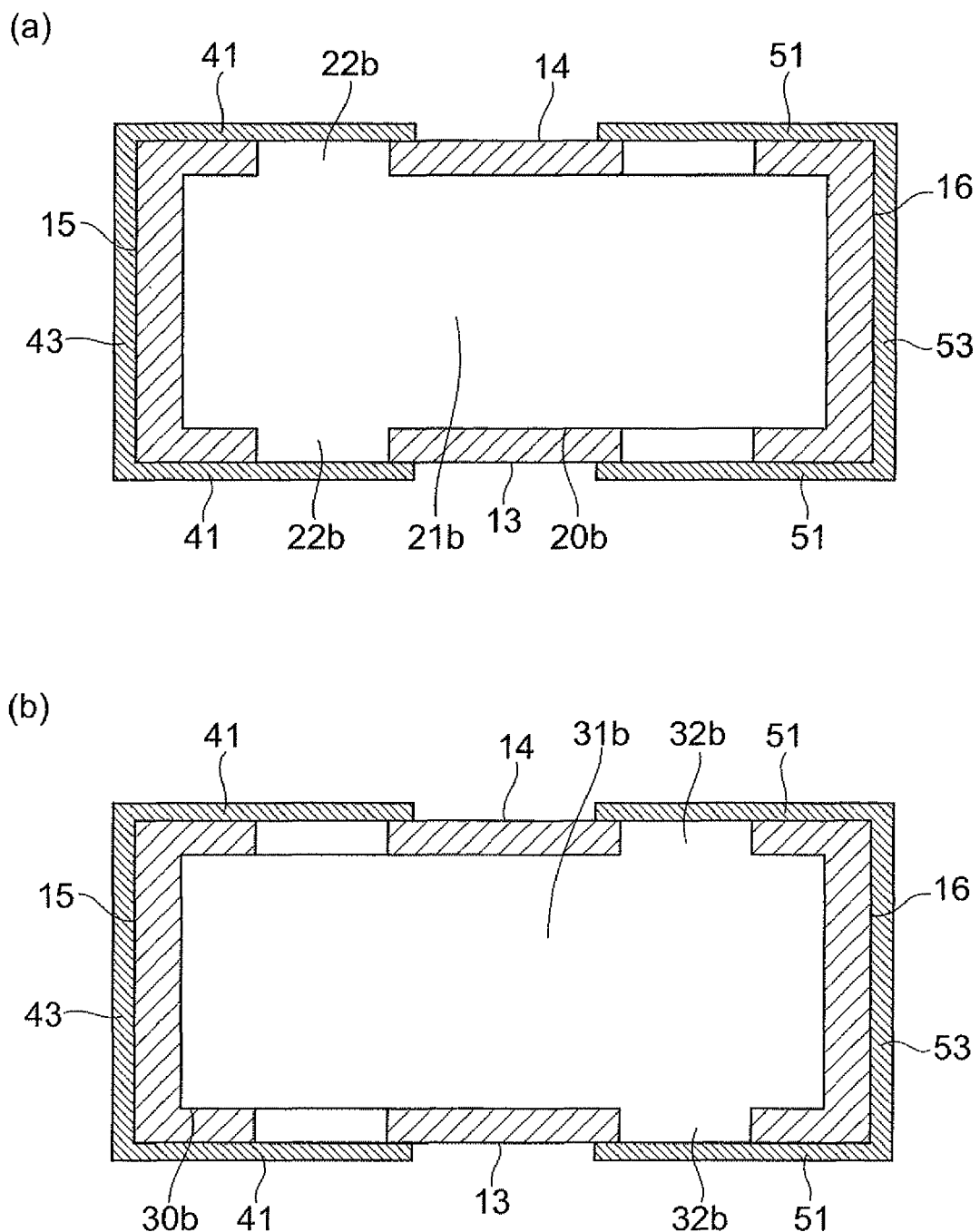
FIG. 13 is a sectional view showing another modification example of internal electrodes.
Figure 14:
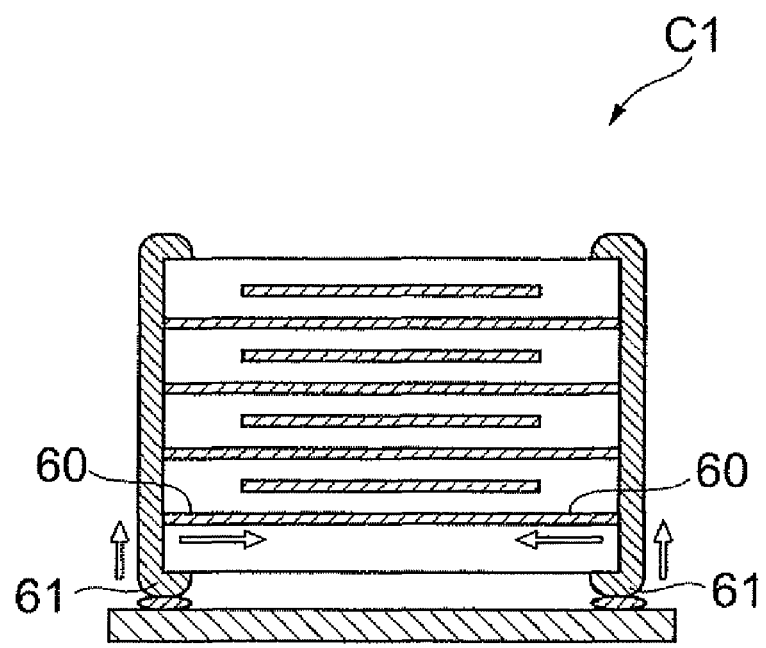
FIG. 14 is a sectional view showing a multilayer capacitor.

In the second modification example of the internal electrodes shown in FIG. 13, each first internal electrode 20b is formed apart by a predetermined distance from the third side face 15 and is not connected to the fifth terminal portion 43, different from those in the first modification example and others. In the configuration except for it, the first internal electrode 20b is of a shape approximately similar to that of the first internal electrodes 20a in the first modification example, and has a main electrode portion 21b and two lead portions 22b. Each second internal electrode 30b is of a line-symmetric shape with respect to the line along the direction where the first and second side faces 13, 14 are opposed, and has a main electrode portion 31b and two lead portions 32b, as shown in FIG. 13(b). Each second internal electrode 30b is located apart by a predetermined distance from the fourth side face 16 and is not connected to the seventh terminal portion 53.

The shape of the second terminal portions 42, the sixth terminal portions 44, the fourth terminal portions 52, and the eighth terminal portions 54 of the terminal electrodes 40, 50 arranged on the first and second principal faces is not limited to the approximately sectorial shape, but may be any shape including a wide part and a narrow part. It is also noted that all of the second terminal portions 42, the sixth terminal portions 44, the fourth terminal portions 52, and the eighth terminal portions 54 do not have to include the wide part and the narrow part. The multilayer capacitor 1 does not have to be limited to that produced by the aforementioned terminal forming method, but may be one produced by any other forming method.

From the invention thus described, it will be obvious that the invention may be varied in many ways. Such variations are not to be regarded as a departure from the spirit and scope of the invention, and all such modifications as would be obvious to one skilled in the art are intended for inclusion within the scope of the following claims.

What is claimed is:

1. A multilayer capacitor comprising:
a capacitor element body having first and second principal faces of a rectangular shape opposed to each other, first and second side faces opposed to each other and extending in a long-side direction of the first and second principal faces so as to connect the first and second principal faces, and third and fourth side faces opposed to each other and extending in a short-side direction of the first and second principal faces so as to connect the first and second principal faces;
a first internal electrode arranged in the capacitor element body and having two lead portions extending in a first lead width and toward the first and second side faces, respectively;
a second internal electrode arranged in the capacitor element body so as to be opposed at least in part to the first internal electrode in a direction in which the first and second principal faces are opposed, and having two lead portions extending in a second lead width and toward the first and second side faces, respectively;
a first terminal electrode having first terminal portions arranged on the first side face and on the second side face, respectively, on the third side face side and connected to the two lead portions, respectively, of the first internal electrode, and second terminal portions arranged on the first side face side and on the second side face side, respectively, on the second principal face and connected to the first terminal portions, respectively; and
a second terminal electrode having third terminal portions arranged on the first side face and on the second side face, respectively, on the fourth side face side and connected to the two lead portions, respectively, of the second internal electrode, and fourth terminal portions arranged on the first side face side and on the second side face side, respectively, on the second principal face and connected to the third terminal portions, respectively,
wherein each of the second terminal portions of the first terminal electrode includes a wide part a width of which in a direction in which the first and second side faces are opposed, is wider than the first lead width of the lead portions in the first internal electrode, and a narrow part the width of which decreases from the wide part toward the second terminal electrode and toward the first or second side face side on which each second terminal portion is arranged.

2. The multilayer capacitor according to claim 1, wherein the first terminal electrode has a fifth terminal portion arranged on the third side face to connect the first terminal portions to each other, and connected to the first internal electrode.

3. The multilayer capacitor according to claim 1,
wherein the first terminal electrode has sixth terminal portions arranged on the first side face side and on the second side face side, respectively, on the first principal face and connected to the first terminal portions, respectively, and
wherein each of the sixth terminal portions has a wide part a width of which in the direction in which the first and second side faces are opposed, is larger than the first lead width of the lead portions in the first internal electrode, and a narrow part the width of which decreases from the wide part toward the second terminal electrode and toward the first or second side face side on which each sixth terminal portion is arranged.

4. The multilayer capacitor according to claim 1,
wherein each of the fourth terminal portions of the second terminal electrode includes a wide part a width of which in the direction in which the first and second side faces are opposed, is wider than the second lead width of the lead portions in the second internal electrode, and a narrow part the width of which decreases from the wide part toward the first terminal electrode and toward the first or second side face side on which each fourth terminal portion is arranged, and
wherein Formula (1) below is satisfied:

$$3.4 \times (a+b) + 1.5 \times c + 0.16 \times \{(d+e)/(f+g)\} \leq 1.5 \quad (1),$$

where a (mm) is the first lead width of the lead portions in the first internal electrode, b (mm) the second lead width of the lead portions in the second internal electrode, c (mm) a distance between the lead portions in the first internal electrode and the lead portions in the second internal electrode, d (mm) a distance between the first terminal electrode on the second principal face and the first internal electrode, e (mm) a distance between the second terminal electrode on the second principal face and the second internal electrode, f (mm) the width in the wide part in one of the second terminal portions on the first side face side and in one of the fourth terminal portions on the first side face side, and g (mm) the width in the wide part in the other of the second terminal portions on the second side face side and in the other of the fourth terminal portions on the second side face side.

5. The multilayer capacitor according to claim 1, wherein the second terminal electrode has a seventh terminal portion arranged on the fourth side face to connect the third terminal portions to each other, and connected to the second internal electrode.

6. The multilayer capacitor according to claim 1,
wherein the second terminal electrode has eighth terminal portions arranged on the first side face side and on the second side face side, respectively, on the first principal face and connected to the third terminal portions, respectively, and
wherein each of the eighth terminal portions includes a wide part a width of which in the direction in which the first and second side faces are opposed, is wider than the second lead width of the lead portions in the second internal electrode, and a narrow part the width of which decreases from the wide part toward the first terminal electrode and toward the first or second side face side on which each eighth terminal portion is arranged.

* * * * *